US007308273B2

(12) United States Patent
Zhang

(10) Patent No.: US 7,308,273 B2
(45) Date of Patent: Dec. 11, 2007

(54) METHOD FOR DETERMINING A LOCATION

(75) Inventor: Honglei Zhang, Tampere (FI)

(73) Assignee: Nokia Corporation, Espoo (FI)

( * ) Notice: Subject to any disclaimer, the term of this patent is extended or adjusted under 35 U.S.C. 154(b) by 281 days.

(21) Appl. No.: 10/867,071

(22) Filed: Jun. 14, 2004

(65) Prior Publication Data

US 2005/0277427 A1   Dec. 15, 2005

(51) Int. Cl.
   *H04Q 7/20*   (2006.01)
(52) U.S. Cl. .............................. 455/456.1; 455/404.2; 455/456.3; 455/41.2; 455/553.1; 370/338
(58) Field of Classification Search ..... 455/456.1–457, 455/466, 404.2, 41.2, 422.1, 550.1, 553; 370/328, 389, 401, 342, 338, 351–352; 701/200, 701/207, 213; 340/539.23, 539.19; 709/206, 709/223
See application file for complete search history.

(56) References Cited

U.S. PATENT DOCUMENTS

| 6,845,239 | B1 * | 1/2005 | Sato et al. ............... 455/456.1 |
| 6,879,835 | B2 * | 4/2005 | Greene et al. ........... 455/456.1 |
| 6,888,936 | B1 * | 5/2005 | Groen et al. ........... 379/207.12 |
| 6,999,777 | B1 * | 2/2006 | Ganesh .................. 455/456.1 |
| 2001/0018349 | A1 * | 8/2001 | Kinnunen et al. .......... 455/456 |
| 2003/0100326 | A1 * | 5/2003 | Grube et al. ................ 455/515 |
| 2003/0118015 | A1 * | 6/2003 | Gunnarsson et al. ........ 370/389 |
| 2004/0103289 | A1 * | 5/2004 | Akama ....................... 713/186 |
| 2004/0203903 | A1 * | 10/2004 | Wilson et al. ........... 455/456.1 |
| 2004/0259585 | A1 * | 12/2004 | Yitzchak et al. ......... 455/550.1 |
| 2004/0266456 | A1 * | 12/2004 | Bostrom et al. ......... 455/456.2 |
| 2005/0009540 | A1 * | 1/2005 | Lee et al. ................ 455/456.6 |
| 2005/0143094 | A1 * | 6/2005 | Reed et al. .............. 455/456.2 |
| 2005/0163093 | A1 * | 7/2005 | Garg et al. .................. 370/342 |
| 2005/0208938 | A1 * | 9/2005 | Pecen et al. ................ 455/428 |
| 2005/0221813 | A1 * | 10/2005 | Rajahalme et al. ...... 455/422.1 |
| 2005/0227705 | A1 * | 10/2005 | Rousu et al. ............. 455/456.1 |
| 2006/0046743 | A1 * | 3/2006 | Mirho ...................... 455/456.3 |
| 2006/0172744 | A1 * | 8/2006 | Tornkvist et al. ......... 455/456.1 |
| 2006/0264233 | A1 * | 11/2006 | Won et al. ............... 455/552.1 |

* cited by examiner

*Primary Examiner*—Jean Gelin
*Assistant Examiner*—Kamran Afshar
(74) *Attorney, Agent, or Firm*—Perman & Green, LLP

(57) ABSTRACT

A method for providing a mobile telecommunications terminal with location information is disclosed. The mobile telecommunication terminal is adapted to communicate with a base station via a first wireless communication protocol. The method includes transmitting, from the mobile telecommunications terminal via a second wireless communication protocol, a location information request to at least one device being enabled to share location information, and receiving, in the mobile communications terminal, location information from the at least one device.

31 Claims, 4 Drawing Sheets

METHOD FOR DETERMINING A LOCATION

TECHNICAL FIELD

The present invention generally relates to wireless service sharing between different devices, and more specifically to a method and apparatus for providing a mobile telecommunications terminal with location information.

TECHNICAL BACKGROUND

In many daily situations it is desirable to be able to determine the current position of a person or an object. For instance, a person who is new to a town and who does not know how to find his way to a specific location may be assisted by the provision of his current geographic position and the position of the specific location in question. Another situation when a person's current position is of interest is when traveling by car in an unfamiliar place. The current position of the person and the geographic position of the destination will assist the person in finding his way towards the destination.

When using an electronic device with a graphical interface, acquired position data are often graphically superimposed on a map before being provided to a user, thereby making it possible for the user to determine the best suitable way to travel. In some cases the position data and the map information may be further utilized in order to provide the user with direction guidance, i.e. Instead of merely showing the user's current position, the system may provide suggestions e.g. When to turn left or right.

Another, more important situation in which the position of a person is of interest is in case of emergency. If a person makes an emergency call (e.g. 911 in the United States or 112 in Europe) from a stationary telephone connected to the PST (Public Switched Telephone Network), the position of the caller is easy to determine due to the provision of ANTI (Automatic Number Identification) and possibly AIL (Automatic Location Identification) to the emergency call center. When an emergency call originates from a residential stationary telephone, the emergency call center receives the caller's telephone number and address hence making it possible to direct the help needed to the correct location.

However, in case a person makes an emergency call from a mobile telephone the position of the caller is much harder to determine with sufficient accuracy. In order to obtain a rough estimation of the caller's position it is possible to find out which base station that is currently serving the mobile terminal, and consequently also the cell in which the mobile telephone is operating. However, the size of the cell may vary from a few hundred meters to several kilometers depending on terrain, capacity demands, etc.

So as to provide more accurate positioning of a mobile terminal different techniques have been employed in the art. Generally, network-based methods or handset-based methods or hybrid methods combining the two are used for determining the position of a mobile terminal.

Among the network-based methods, TOGA (Time Difference of Arrival) which measures the difference between signal arrival times between different base stations, TAO (Time of Arrival) which measures absolute arrival times rather than time differences, ABA (Angle of Arrival) which use antenna arrays to determine a signal's incident angle, and Multi-path interference which records "fingerprints" from different locations, are widely used for more accurate determination of the position of a mobile terminal.

Correspondingly, among handset-based methods, E-OTD (Enhanced Observed Time Difference) which measures the relative time of arrival of signals from multiple mutually asynchronous base stations and A-FELT (Advanced Forward-Link Trilateration) which measures the phase delay between pairs of pilot signals in a synchronous mobile telephone network such as UMTS (Universal Mobile Telecommunications System), are widely used for making it possible for the mobile terminal to know its position. Yet another approach is to use GPS (Global Positioning System) which is very accurate, but at the same time is very slow, i.e. the time needed for determining the current position of the GPS receiver may be several minutes which is far too long in case of emergency.

Although systems for providing positioning services exist, the network-based techniques mentioned above are not implemented in all mobile telecommunications networks. Similarly, far from all mobile terminals used today are enabled to determine their location by means of the handset-based technologies. In case of emergency the consequences of not being able to report the correct position of an accident to the emergency call center due to the lack of positioning capabilities may be a matter of life and death. Consequently, there is a great need for techniques that may provide emergency call centers with accurate information regarding the position of the calling mobile terminal. For example, the FCC (Federal Communications Commission) requires network-based location systems to provide the position of the calling mobile terminal within a tolerance of 50 m for 65% of the calls and 150 m for 95% of the calls.

Moreover, besides in case of emergency, positioning capabilities may be used in a broader scale, wherein the position of the mobile terminal may be used for presenting any kind of location information to the user, i.e. in addition to the current position, ads or offers specific to the region the user is traveling in may be presented by the provision of location based services. Other location bases services include traffic advisory, navigation help, and roadside assistance. Mobile terminals not enabled for location based services will hence not be able to provide possibly valuable local information to the user thereof.

SUMMARY OF THE INVENTION

An object of the present invention is to overcome the above described problems of the known technologies in regards to determining the position of a mobile telecommunications terminal. A particular advantage of the present invention is the provision of positioning data to an emergency call center in case of emergency. A further advantage of the invention is the possibility to share services and resources with other users of mobile telecommunications terminals. Still an advantage is simplicity of use since the mobile telecommunications terminal may be adapted to automatically determine and report its position in case of emergency.

A particular feature of the present invention relates to the provision of an apparatus which is able to determine its position with acceptable accuracy even though it lacks the necessary means for direct determination of its own position.

The above objects, advantages and features together with numerous other objects, advantages and features, which will become evident from the detailed description below, are obtained according to a first aspect of the present invention by a method for providing a mobile telecommunications terminal with location information, wherein the mobile telecommunications terminal is adapted to communicate with a base station via a first wireless communication protocol, said method comprising:

transmitting, from the mobile telecommunications terminal via a second wireless communication protocol, a location information request to at least one device being enabled to share location information, and receiving, in the mobile telecommunications terminal, location information from the at least one device.

The method hence enables reception of location information, such as position data, in the mobile telecommunications terminal even though the mobile telecommunications terminal lacks the necessary hardware for such reception via the first wireless communication protocol.

According to one embodiment the first communication protocol is used for mobile telephony in a mobile telecommunications network. The mobile telecommunications terminal is hence able to communicate with important resources, such as an emergency call center.

According to one embodiment the location information request is automatically transmitted via the second wireless communication protocol in response to an initiation of a telephone call via the first communication protocol. A user of the mobile telecommunications terminal does not have to worry about the provision of e.g. position data to the emergency call center in a case of emergency.

According to one embodiment the telephone call initiating the transmittal of the location information request corresponds to one or more predetermined telephone numbers. The user or a supervisor may then define one or more telephone numbers which when dialed on the mobile telecommunications terminal will initiate a transmission of a location information request.

According to the invention the provided location information may be one or more location based services. A user of the mobile telecommunications terminal may then be provided with location based services from other devices in the vicinity even though the user does not subscribe to all available services.

According to the invention the provided location information may be position data related to the position of the device. The mobile telecommunications terminal does hence not have to comprise e.g. a complex GPS-receiver in order to determine its own position.

According to one embodiment communication via the second communication protocol has shorter range than communication via the first communication protocol. The accuracy of the received location information is then maintained due to the shorter range the location information request may be transmitted.

According to the invention communication via the second communication protocol has a range of less than 50 m and preferably approximately 10 m. The received location information is hence provided within a small area surrounding the mobile telecommunications terminal making it possible to actually provide local information as the mobile telecommunications terminal moves from one location to another.

According to one embodiment the received location information is transferred to the base station via the first wireless communication protocol. The location information may hence be shared with other parties who have access to the base station.

According to one embodiment the received location information is transferred to the destination of the initiated telephone call. The location information may hence be transferred from the mobile telecommunications terminal to e.g. an emergency call center.

According to one embodiment the received location information is sent by means of a messaging system, such as short message service (SMS). It is hence possible to transfer the location information to a third party without further modifications of the mobile telecommunications terminal.

According to one embodiment the location information request is transmitted from the mobile telecommunications terminal, via a third wireless communication protocol having longer range than the second wireless communication protocol, to at least one device being enabled to share location information. In case the mobile telecommunications terminal does not receive any location information in response to the transmitted location information request, the mobile telecommunications terminal may change to a third wireless communication protocol having a longer range, hence making it possible to receive location information from devices that are located further away from the mobile telecommunications terminal.

The above objects, advantages and features together with numerous other objects, advantages and features, which will become evident from the detailed description below, are obtained according to a second aspect of the present invention by a mobile telecommunications terminal comprising:

a first transceiver adapted to communicate with a base station via a first wireless communication protocol, a second transceiver adapted to communicate with one or more devices via a second wireless communication protocol, said devices being enabled to share location information, wherein the second transceiver is adapted to transmit a location information request to the at least one device via said second wireless communication protocol, and wherein the second transceiver is adapted to receive location information from the at least one device via said second wireless communication protocol.

In the mobile telecommunications terminal the first transceiver may be adapted to communicate via a protocol for mobile telephony in a mobile telecommunications network.

A control unit in the mobile telecommunications terminal may be adapted to automatically instruct the second transceiver to transmit a location information request via the second wireless communication protocol in response to an initiation of a telephone call via the first communication protocol.

The mobile telecommunications terminal may comprise a memory, wherein the control unit is adapted to determine if the initiated telephone call corresponds to one or more telephone numbers stored in the memory, and as a result of a match instruct the second transceiver to transmit the location information request.

The second transceiver may be adapted to receive location information in the form of one or more location based services.

The second transceiver may be adapted to receive location information in the form of position data related to the position of the device.

The second transceiver may have shorter range than the first transceiver.

The second transceiver may be adapted to communicate via a short-range communication protocol such as IrDA, Bluetooth, WLAN, or HomeRF.

The second transceiver may have a range of less than 50 m and preferably approximately 10 m.

The mobile telecommunications terminal may be adapted to transfer to the received location information to the base station via the first wireless communication protocol.

The mobile telecommunications terminal may be adapted to transfer the received location information to the destination of the initiated telephone call via the first wireless communication protocol.

The mobile telecommunications terminal may be adapted to send the received location information via the first wireless communication protocol by means of short message service (SMS).

The mobile telecommunications terminal may be adapted to transmit the location information request via a third wireless communication protocol having longer range than the second wireless communication protocol to at least one device being enabled to share location information.

BRIEF DESCRIPTION OF THE DRAWINGS

The foregoing aspects and other features of the disclosed embodiments are explained in the following description, taken in connection with the accompanying drawings, wherein.

DETAILED DESCRIPTION

A telecommunication system in which the present invention may be applied will first be described with reference to FIG. 1. Then, the particulars of the service sharing technology according to the invention will be described with reference to the remaining FIGS.

Figure 1:
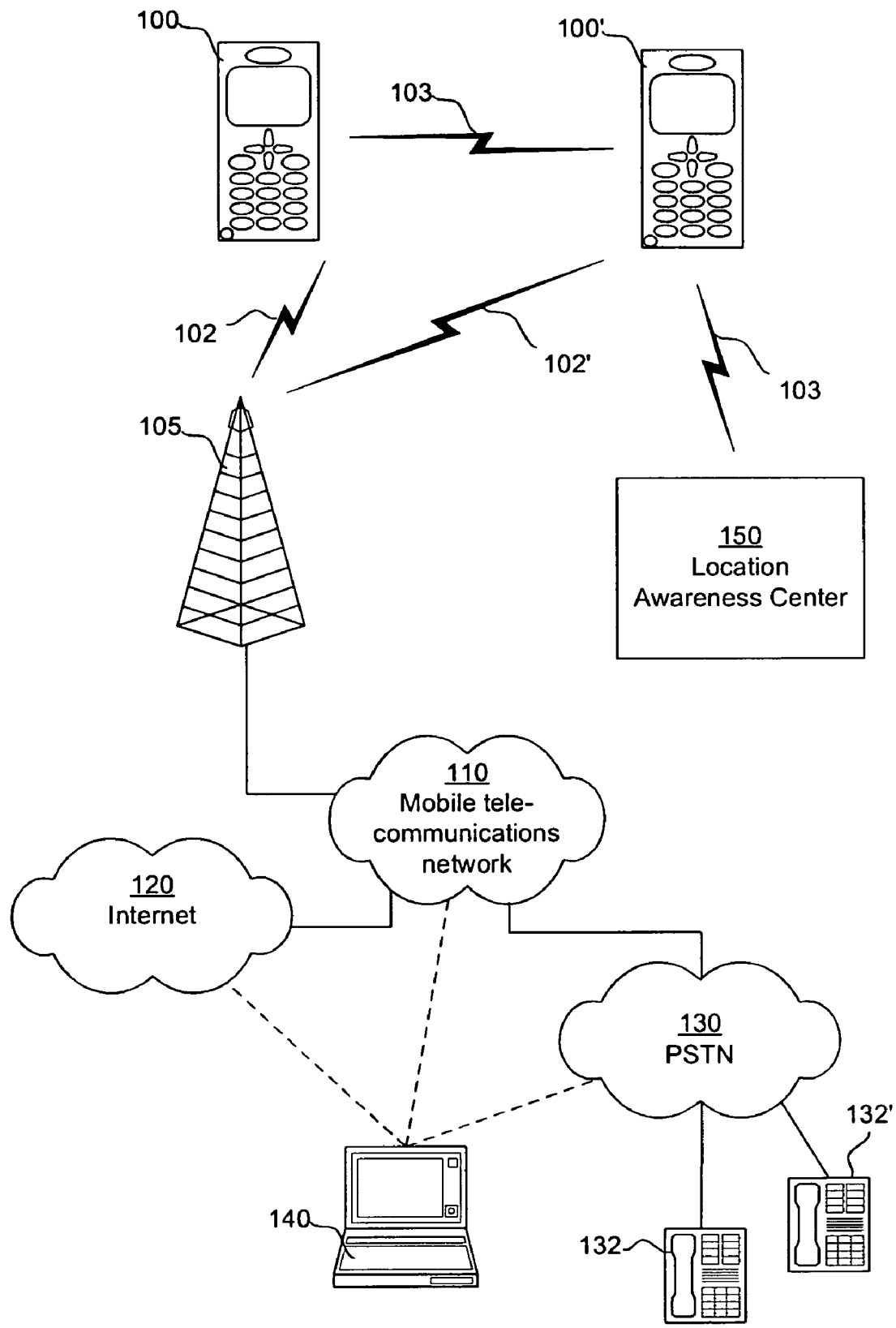
FIG. 1 is an illustration of one example of a telecommunication system in which aspects of the disclosed embodiments may be applied.

In the system of FIG. 1, various units, such as mobile terminals 100, 100' and stationary telephones 132 may communicate by means of different networks 110, 120 and 130. More specifically, data may be transferred from a stationary telephone 132 through the PST 130 and a mobile telecommunications network 110, via a base station 105 thereof across a wireless communication link 102, 102' to a mobile terminal 100 or 100', and vice versa. In addition to this the first and second mobile terminals 100, 100' may communicate directly by means of short-range wireless technology such as Bluetooth, WLAN, HomeRF, IR or any other suitable communication protocol. The mobile terminals 100, 100' may be any commercially available devices for any known mobile telecommunications system, such as GSM, UMTS, D-AMPS or CDMA2000.

Moreover, the system includes a emergency call center 140 which may be connected to the PST, the mobile telecommunications network, and/or the Internet. In the latter case the emergency call center 140 may be provided with software for IP (Internet Protocol) telephony. Normally the emergency call center 140 is receiving emergency calls via the PST, but may, depending on e.g. the infra structure at the location of the emergency call center 140, also be connected to any other network 110, 120.

As will be discussed in more detail below, the system may also include a location awareness center 150 which via short-range wireless technology communicates with the second mobile terminal 100' or any other device which is in its vicinity. The location awareness center 150 knows its position from e.g. a GPS receiver included in the center 150, any network-based or handset-based method described above, or by manual input of position data.

Likewise to the location awareness center 150, the first mobile terminal 100 may be aware of its position by means of any of the positioning techniques described above. However, contrary to the first mobile terminal 100, the second mobile terminal 100' may for many different reasons not be enabled to determine its position by means of any of the handset-based methods. In addition to this it may not be enabled to receive location information from the base station 105 currently serving it. On the other hand, as will be discussed in more detail below, the second mobile telecommunications terminal 100' is equipped with a transceiver for short-range wireless communication. If the mobile telecommunications terminal 100' needs to determine its current position, it may transmit a location information request to all other devices in the vicinity thereof. Any device in the vicinity which is enabled to share its own position, such as the mobile telecommunications terminal 100 and/or the location awareness center 150, responds to the request and informs the mobile telecommunications terminal 100' of its own current position.

Figure 2:
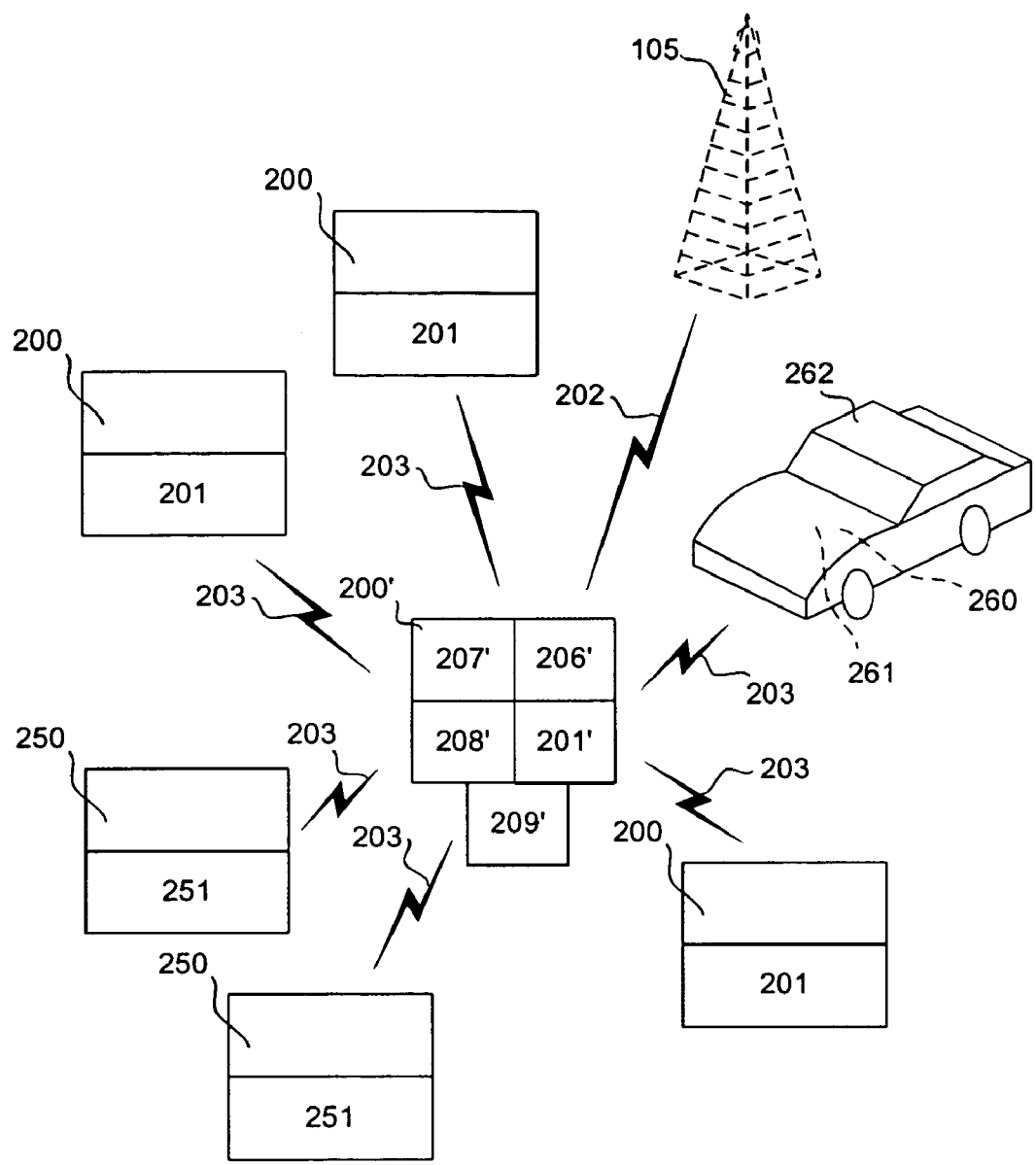
FIG. 2 is a block diagram of the mobile terminal illustrated in FIG. 1.

FIG. 2 is a more detailed view of a mobile telecommunications terminal 200' according to the present invention together with other devices in its vicinity, such as one or more position enabled mobile terminals 200, one or more location awareness centers 250, or one or more GPS receivers 260 that may be part of e.g. a car 262. As mentioned above, the mobile terminals 200 may be equipped with transceivers 201 for short-range wireless communication, such as Bluetooth, WLAN, HomeRF or IR. The same applies for the local awareness centers 250 and the GPS receivers 260 which also may include transceivers 251, 261 for short-range communication. Besides the positioning capabilities and the short-range transceivers 201, 251, 261 the devices may include other functionality or services such as wireless Internet connections (not shown).

When the mobile telecommunications terminal 200' wants to determine its position, a control unit 207' in the mobile telecommunications terminal 200' instructs the short range transceiver 201' to transmit a location information request to one or more devices in the vicinity of the terminal 200'. The transmission of the location information request may be broadcasted to any device in the vicinity by means of point-to-multipoint RF, or a selectively directed towards a specific device if the transceiver communicates e.g. by means of IR.

According to a preferred embodiment of the present invention, the short-range transceiver 201' broadcasts a position request to all devices 200, 250, 260 in the vicinity of the mobile telecommunications terminal 200'. In response to the request one or more position enabled devices 200, 250, 260 reply by transmitting data related to their own position via transceivers 201, 251, 261. Since the position data is received in the mobile telecommunications terminal 200' by means of short-range communication, the control unit 207' in the mobile telecommunications device 201' approximates the current position of the mobile telecommunications terminal 200' with the received position data. The accuracy of the determined position is dependent on the actual protocol, and hence the transmission range, used in the transmitted request. If the mobile telecommunications terminal 200' comprises transceivers for more than one means of communication, e.g. Bluetooth and IrDA, the control unit 207' first instructs the transceiver with the shortest range to transmit a position request. If no reply is received via the first communication means the control unit 207' instructs the other transceiver to transmit a corresponding position request. By this arrangement, and with knowledge of the presumed range of the communication means, control unit 207' may determine the accuracy of the received position data.

In a preferred embodiment of the present invention the control unit 207' automatically instructs the short-range transceiver 201' to transmit a position request in response to the initiation of an emergency call via a transceiver for mobile telephony 206'. The mobile telecommunications terminal 200' may comprise a memory 209' for storing one or more position-inquiring telephone numbers, such as the telephone number to the emergency call center, a district health center, one or more local emergency call centers, a nursing home at which a user of the mobile telecommunications terminal 200' is a patient etc. One or more of the position-inquiring telephone numbers may be automatically stored in the memory 209' as a result of a roaming operation, wherein the operator currently serving the mobile telecommunications terminal 200' may provide local emergency telephone numbers to the mobile telecommunications terminal 200'. When the person using the mobile telecommunications terminal 200' calls e.g. 911, the control unit 207' identifies the number as a position-inquiring number and automatically instructs the short-range transceiver 201' to transmit a position request. After reception of the position from one or more devices in the vicinity, the control unit 207 in the mobile telecommunications terminal 200' may automatically report the current position by means of a messaging system, e.g. SMS (short messaging service), EMS (Enhanced Messaging Service), MMS (Multimedia Messaging Service), GPRS (General Packet Radio Service) data packets, or any other form of messaging means, to the emergency call center 140 via the communication link 202 and the base station 105, or present the current position on a display 208' on the mobile telecommunications terminal 200' so that the user of the mobile telecommunications terminal 200' may report the position manually to the emergency call center. The personnel at the emergency call center 140 may then direct the resources needed to the correct location.

In an alternative embodiment the control unit 207' instructs the transceiver 201' to transmit a position request on demand from a user of the mobile telecommunications terminal 200'. For example, in situation where a user calls the emergency call center 140 and, when asked for his current location, realizes that he is unaware of his current location due to being confused the user may enter an options menu presented on the display 208' on the mobile telecommunications terminal 200' and select e.g. "Request position from peer". The retrieved position is then as well as being displayed to the user also sent to the called party.

Another situation where a manual location request may be useful is in the case where a child calls his grandmother because he is lost and his parents are not answering and the grandmother's telephone number is not listed as a position-inquiring telephone number. The grandmother could then instruct the child to enter the options menu, or use a predetermined button on the mobile telecommunications terminal 200', in order to get a location which is sent to the grandmother without the child having to do too much complicated message sending.

Yet another situation where a manual location request may be useful is in the case where a user of the mobile telecommunications terminal 200' wants to gather his friends at the position where he is currently located (e.g. in a restaurant). The user of the mobile telecommunications terminal 200' may then arrange a conference call known per se and, during the conference call, get his own position as described above and transfer the location to the all parties of the conference call. All persons party to the conference call may then gather at the same location.

In an alternative embodiment the control unit 207' instructs the transceiver 201' to transmit a position request on demand from a user of the mobile telecommunications terminal 200' but does not transmit the received location information to other parties. For example, a location awareness center 250 may be provided in a public place, such as in connection to a tourist information center, a bus terminal, or a tourist attraction. A tourist who wants to know his current location in order to find his way in e.g. an unfamiliar town may use a mobile telecommunications terminal 200' according to the present invention for receiving acceptable positioning data. In the vicinity of the location awareness center 250, the tourist may transmit a position request by e.g. pressing a button or selecting an option in a menu on the mobile telecommunications terminal 200'. In case the transceiver is adapted to communicate via a line of sight technology, such as IR, the user must aim the mobile telecommunications terminal 200' towards a transceiver at the location awareness center 250. Otherwise, if the transceiver is adapted to communicate by means of omni directional RF, the user is not required to aim in any special direction. In response to the position request, the transceiver in the location awareness center 250 transmits its own position to the mobile telecommunications terminal 200' which in turn approximates the position of the location awareness center 250 as its own position.

In this context, the term "vicinity" is dependent on the range of the short-range wireless communication technology used. For example, if the mobile terminal 200' communicates with other devices in its vicinity by means of Bluetooth, the range defining the vicinity is approximately 10 m (in case of 0 dBm transmission power). Other possible Bluetooth ranges are 20 m (in case of 4 dBm transmission power) and 100 m (in case of 20 dBm transmission power). Other ranges equally possible for defining the vicinity are 50 m (HomeRF, WLAN) and 2 m (IrDa). As mentioned above with regard to the FCC requirements, at some instances positioning data with an actual error of 150 m may be acceptable.

Figure 3:
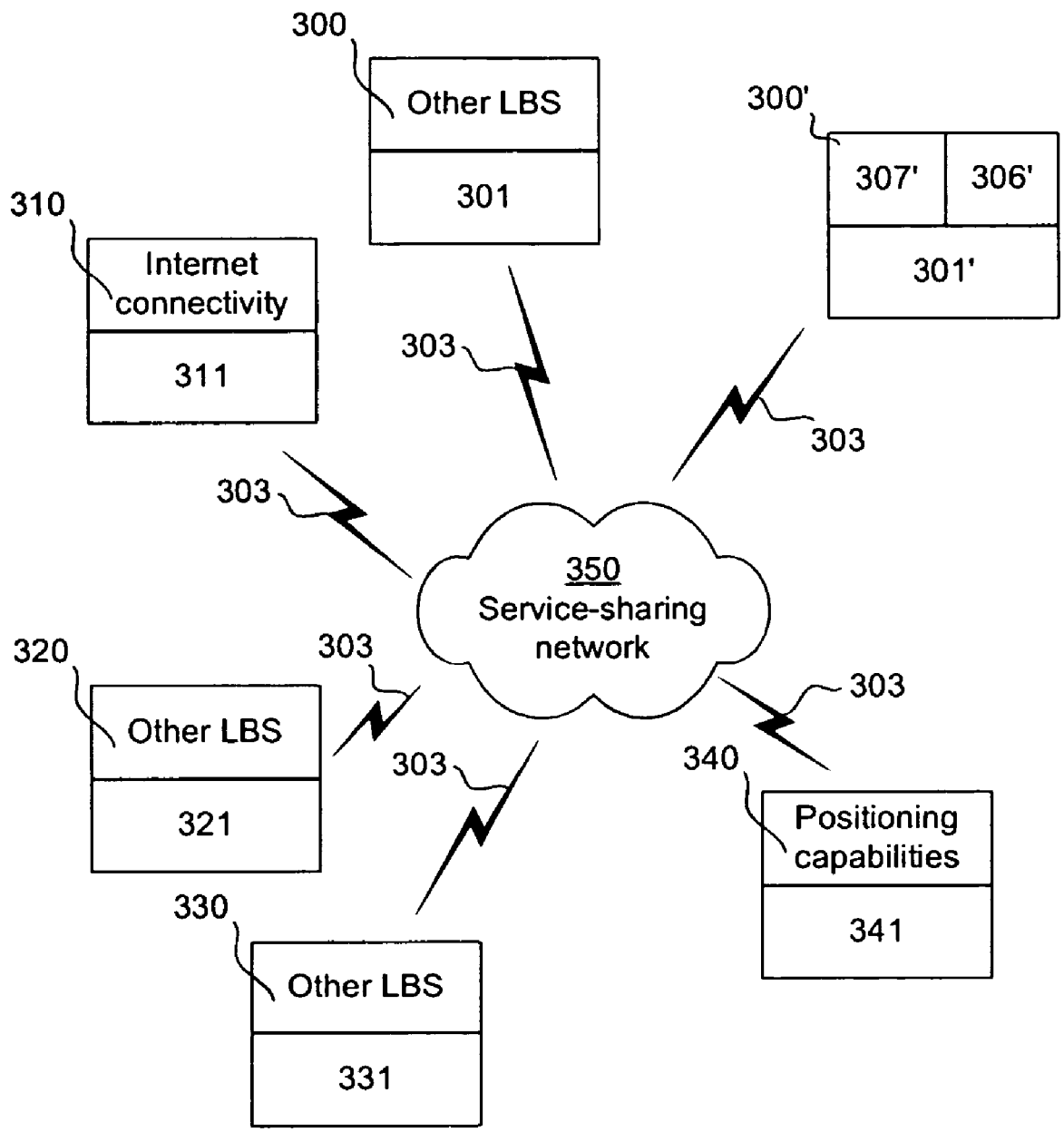
FIG. 3 is a block diagram of one aspect of the disclosed embodiments.

FIG. 3 illustrates an alternative embodiment of the present invention, in which the mobile telecommunications terminal 300' is part of a service-sharing network 350. The service sharing network 350 is established via short-range communication by devices 300-340 that are positioned in the vicinity of each other. Within the service-sharing network, end users may be provided with a vast range of services without the need for subscription of all the services from the operators of the networks for mobile communication. Instead, by sharing the resources provided by the operators, an individual end user may gain access to one or more services from another user in the same service-sharing network. A user of a mobile telecommunications terminal 300-310 may become part of the service-sharing network by simply providing one or more services, such as Internet connectivity, location data or any form of location based service, to other users of the network 350. Other forms of access requirements for the network 350, such as membership in a society or employment at a specific company, are however equally possible within the scope of the invention.

Figure 4:
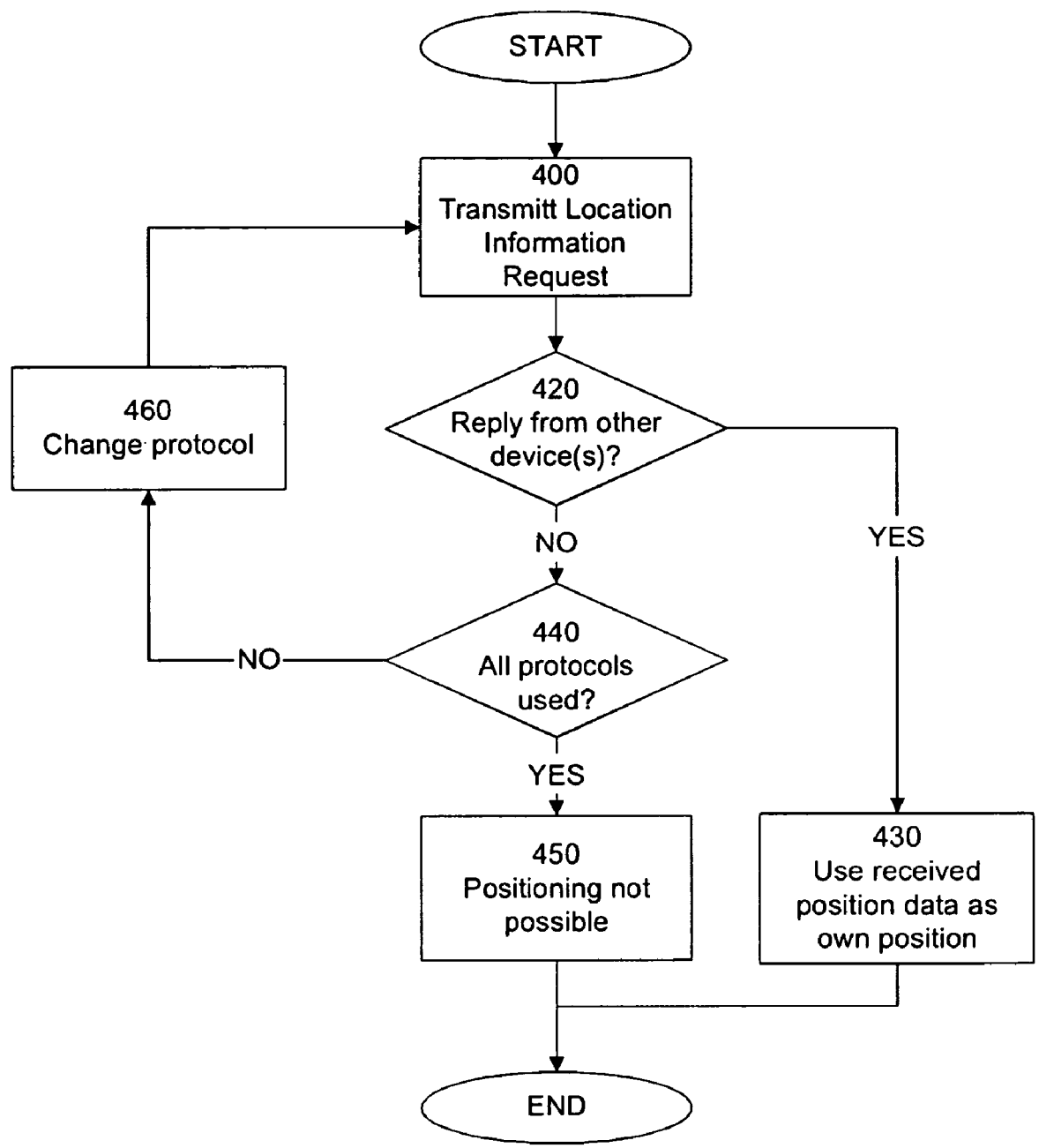
FIG. 4 is a flow chart illustrating one example of receiving location information according to the disclosed embodiments.

FIG. 4 is a flow chart illustrating a method for receiving location information in a mobile telecommunications terminal according to the invention. The routine begins in step 400 when the mobile telecommunications terminal 200' transmits a location information request. The location information request may be a request for the current position of any device in the vicinity, or a request for any other service that may be shared between devices via short-range communication. In case the mobile telecommunications terminal 200' is enabled to communicate via more than one short-range communication protocol, the request is first transmitted via the protocol that has the shortest expected range.

In step 420 the mobile telecommunications terminal 200' determines if any reply to the request has been received from any device in the vicinity. If a reply has been received from one or more devices, the routine proceeds to step 430, wherein the mobile telecommunications terminal 200' uses the received location information dependent on its content. As an example, in FIG. 4 the received location information is in the form of position data which the mobile telecommunications terminal 200' uses for determining its own position.

If no reply is received within a predetermined time interval in step 420, the mobile telecommunications terminal 200' determines in step 440 if all available communication protocols have been used for transmitting the location information request. The time interval in which the mobile telecommunications 200' terminal awaits a reply from other devices in its vicinity may be pre-programmed into the memory 209' of the mobile telecommunications terminal 200' when manufactured, or may be manually entered by the user after purchase of the mobile telecommunications terminal 200'. If all possible protocols have been used for requesting location information, the routine continues to step 450, wherein it is determined that positioning of the mobile telecommunications terminal 200' is not possible. However, if one or more protocols have not been used for transmitting the request for location information in step 420, the routine continues from step 440 to step 460, wherein the mobile telecommunications terminal 200' changes protocol for the location information request. The next protocol to be used among the available protocols has longer range than the first protocol used. The accuracy of the received position data is then lowered, but any position data, particularly in case of emergency, may be beneficial for guidance of e.g. ambulance personnel. The routine thereafter jumps back to step 400 and transmits the location information request via the new protocol. The routine continues to loop through the various available protocols until a reply is received or it is determined that no location information is available. In the former case the mobile telecommunications terminal may report its current position to the user thereof and/or the emergency call center. In the latter case the mobile telecommunications terminal may report that no positioning data is available, wherein the emergency call center at least may be able to determine which cell the mobile telecommunications terminal is operating in.

While the present invention has been particularly shown and described with reference to specific embodiments thereof, it will be understood by those skilled in the art that various changes in form and detail may be made thereto, and that other embodiments of the present invention beyond embodiments specifically described herein may be made or practiced without departing from the spirit and scope of the present invention as limited solely by the appended claims.

The invention claimed is:

1. A method for providing a mobile telecommunications terminal with location information comprising:
   communicating, through the mobile telecommunications terminal, with a base station via a first wireless communication protocol used for mobile telephony in a mobile telecommunications network;
   transmitting, from the mobile telecommunications terminal via a second wireless communication protocol, a location information request to at least one device being enabled to share location; and
   receiving, in the mobile telecommunications terminal, the location information via the second communication protocol, the location information corresponding to a current position of the at least one device, from the at least one device; and
   in response to an initiation of a telephone call via the first wireless communication protocol automatically transmitting the location information request via the second communication protocol if the initiated telephone call corresponds to one or more pre-determined telephone numbers;
   wherein a control unit is adapted to determine if the initiated telephone call corresponds to one or more pre-determined telephone numbers stored in a storage, and as a result of a match instruct the second transceiver to transmit the location information request.

2. The method according to claim 1, wherein the location information request is automatically transmitted via the second wireless communication protocol in response to an initiation of a telephone call via the first communication protocol.

3. The method according to claim 2, wherein the telephone call initiating the transmittal of the location information request corresponds to one or more predetermined telephone numbers.

4. The method according to claim 2, wherein the received location information is transferred to the destination of the initiated telephone call.

5. The method according to claim 4, wherein the received location information is sent by means of a messaging system.

6. The method according to claim 5, wherein the messaging system is a short message service (SMS), enhanced messaging service (EMS), multimedia messaging service (MMS) or GPRS (general packet radio service) data packets.

7. The method according to claim 1, wherein the provided location information relates to one or more location based services.

8. The method according to claim 1, wherein communication via the second communication protocol has shorter range than communication via the first communication protocol.

9. The method according to claim 1, wherein the second communication protocol is a short-range communication protocol.

10. The method according to claim 9, wherein communication via the second communication protocol has a range of less than 150 m.

11. The method according to claim 9, wherein the short range communication protocol is an IrDA, Bluetooth, WLAN, or HomeRF communication protocol.

12. The method according to claim 9, wherein communication via the second
   communication protocol has a range of approximately 10 m.

13. The method according to claim 1, wherein the received location information is transferred to the base station via the first wireless communication protocol.

14. The method according to claim 1, wherein one or more telephone communication links are established, via the first communication protocol, to one or more parties operatively coupled to the mobile communications network prior to transmitting the location information request via the second wireless communication protocol, and wherein the received location information is transferred to the one or more parties via the one or more established communication links.

15. The method according to claim 1, wherein the location information request is transmitted from the mobile telecommunications terminal, via a third wireless communication protocol having longer range than the second wireless communication protocol, to at least one device being enabled to share location information.

16. The method of claim 1 wherein the second wireless communication protocol is selected from one of at least one wireless communication protocol of the mobile telecommunications terminal, the selected wireless communication protocol being the protocol that is configured to transmit with a shortest range out of all of the at least one wireless communication protocols of the mobile telecommunication terminal.

17. The method of claim 16 wherein selecting the second wireless communication protocol further comprises determining if a response is received from the at least one device to a transmission with a first selected second wireless communication protocol, and if no response is received, selecting a next protocol that has a longer range than the first selected protocol.

18. A mobile telecommunications terminal comprising:
a first transceiver adapted to communicate with a base station via a first wireless communication protocol for mobile telephony in a mobile telecommunications network;
a second transceiver adapted to communicate with one or more devices via a second wireless communication protocol, the one or more devices being enabled to share location information;
wherein the second transceiver is adapted to transmit a location information request to the one or more devices via said second wireless communication protocol; and
wherein the second transceiver is adapted to receive location information from one or more of the one or more devices via said second wireless communication protocol, the location information identifying a respective position of the one or more devices;
a control unit is adapted to automatically instruct the second transceiver to transmit the location information request via the second wireless communication protocol in response to an initiation of a telephone call via the first communication protocol if the initiated telephone call corresponds to one or more pre-determined telephone numbers;
comprising a storage, wherein the control unit is adapted to determine if the initiated telephone call corresponds to one or more ore-determined telephone numbers stored in the storage, and as a result of a match instruct the second transceiver to transmit the location information request.

19. The mobile telecommunications terminal according to claim 18, wherein said storage further comprises a memory, wherein the control unit is adapted to determine if the initiated telephone call corresponds to one or more pre-determined telephone numbers stored in the memory.

20. The mobile telecommunications terminal according to claim 18, wherein the second transceiver is adapted to receive location information in the form of one or more location based services.

21. The mobile telecommunications terminal according to claim 18, wherein the second transceiver has shorter range than the first transceiver.

22. The mobile telecommunications terminal according to claim 18, wherein the second transceiver is adapted to communicate via a short-range communication protocol.

23. The mobile telecommunications terminal according to claim 22, wherein the second transceiver has a range of less than 150 m.

24. The method according to claim 22, wherein the short range communication protocol is an IrDA, Bluetooth, WLAN, or HomeRF communication protocol.

25. The mobile telecommunications terminal according to claim 22, wherein the second transceiver has a range of approximately 10 m.

26. The mobile telecommunications terminal according to claim 18, wherein the mobile telecommunications terminal is adapted to transfer to the received location information to the base station via the first wireless communication protocol.

27. The mobile telecommunications terminal according to claim 18, wherein the mobile telecommunications terminal is adapted to transfer the received location information to the destination of the initiated telephone call via the first wireless communication protocol.

28. The mobile telecommunications terminal according to claim 27, wherein the mobile telecommunications terminal is adapted to send the received location information via the first wireless communication protocol by means of a messaging system.

29. The method according to claim 28, wherein the messaging system is a short message service (SMS), enhanced messaging service (EMS), multimedia messaging service (MMS) or GPRS (general packet radio service) data packets.

30. The mobile telecommunications terminal according to claim 18, wherein the mobile telecommunications terminal is adapted to establish one or more telephone communication links, via the first communication protocol, to one or more parties operatively coupled to the mobile communications network prior to transmitting the location information request via the second wireless communication protocol, and
wherein the mobile telecommunications terminal is adapted to transfer the received location information to the one or more parties via the one or more established communication links.

31. The mobile telecommunications terminal according to claim 18, wherein the mobile telecommunications terminal is adapted to transmit the location information request via a third wireless communication protocol having longer range than the second wireless communication protocol to at least one device being enabled to share location information.

* * * * *